United States Patent [19]

Hackert

[11] 4,031,060

[45] June 21, 1977

[54] PROCESS OF PIGMENTING POLYAMIDES

[75] Inventor: Raymond Leo Hackert, Salisbury, Md.

[73] Assignee: E. I. Du Pont de Nemours and Company, Wilmington, Del.

[22] Filed: Sept. 17, 1976

[21] Appl. No.: 724,097

[52] U.S. Cl. .......................... 260/37 N; 106/308 N
[51] Int. Cl.$^2$ ....................................... C08L 77/00
[58] Field of Search ............. 260/37 N; 106/308 N

[56] References Cited

UNITED STATES PATENTS

| | | | |
|---|---|---|---|
| 3,522,209 | 7/1970 | Lee | 260/45.95 |
| 3,533,984 | 10/1970 | Yamamoto et al. | 260/37 N |
| 3,809,670 | 5/1974 | Costain et al. | 260/37 N |
| 3,824,207 | 7/1974 | Carter | 260/37 N |

FOREIGN PATENTS OR APPLICATIONS

| | | |
|---|---|---|
| 6,832 | 3/1969 | Japan |
| 1,081,965 | 9/1967 | United Kingdom |
| 1,092,617 | 11/1967 | United Kingdom |

*Primary Examiner* — Lewis T. Jacobs

[57] ABSTRACT

An aqueous dispersion of a pigment for use in a polymerization process to form a pigmented polyamide by addition of the dispersion to the polymer-forming reactants prior to completion of the polymerization is prepared by attrition milling a slurry containing about 70 to 80% by weight of pigment in water in the presence of a dispersing agent to separate agglomerated pigment particles, then with additional milling, mixing the milled slurry with a concentrated aqueous solution of a nylon salt to flocculate the pigment particles and to form a flocculated dispersion containing 25 to 45% pigment.

8 Claims, No Drawings

PROCESS OF PIGMENTING POLYAMIDES

BACKGROUND OF THE INVENTION

1. Field of the Invention

This invention concerns the preparation of aqueous dispersions of pigments for use in preparation of pigmented polyamides. The dispersions are added to the polymer-forming reactants prior to completion of the polymerization.

2. Description of the Prior Art

Pigments are frequently incorporated into synthetic polymers prior to extrusion of the polymer into fibers or other shaped articles in order to modify the polymer luster or color. U.S. Pat. No. 2,278,878 describes a method for adding the pigment during the preparation of the polymer. U.S. Pat. No. 3,526,609 describes an improved method for preparing aqueous pigment dispersions for addition to the polymer forming reactants before or during the polymerization.

SUMMARY OF THE INVENTION

This invention provides an improved method for preparing concentrated aqueous dispersions of pigments used in the preparation of polyamides. By this invention, highly concentrated, high quality dispersions having improved stability and ease of handling can be prepared economically. The concentrated dispersions are particularly helpful in the preparation of polyamides having high pigment concentrations.

The invention is in a polymerization process to form a pigmented polyamide from a nylon salt wherein an aqueous dispersion of a finely divided mineral pigment is added to the polymerforming reactants prior to completion of the polymerization, the improvement comprising preparing the dispersion by attrition milling a concentrated slurry, preferably containing about 70 to 80% by weight, of pigment in water in the presence of a dispersing agent to separate agglomerated pigment particles and mixing the milled slurry with a concentrated aqueous solution of the nylon salt to flocculate the pigment particles and with additional milling forming a flocculated dispersion containing from about 25 to 45% of the pigment.

The invention is particularly effective with titanium dioxide pigment both in the anatase and rutile forms.

Tetrasodium pyrophosphate (TSPP) is a particularly effective dispersing agent for use in milling the slurry particularly in an amount of about 0.2–0.6% by weight of the pigment. Within that range, a most particularly preferred amount is that which gives a minimum slurry viscosity for the milling operation. The exact amount required for this minimum viscosity can vary from batch to batch dependent upon the particular batch of pigment being employed. It is common practice to determine the dispersing agent requirements for each new batch of pigment when making aqueous dispersions.

To maximize the pigment concentration of the resulting dispersion, a substantially saturated aqueous nylon salt solution should be used for mixing with the milled slurry. Such a salt concentration under ambient conditions for an aqueous solution of hexamethylenediammonium adipate salt is about 48% by weight.

A preferred concentration for the flocculated dispersion is about 36 to 41% titanium dioxide pigment with about 20 to 22% salt for 66-nylon with the remainder consisting essentially of water. There is a greatly reduced tendency for this flocculated dispersion to settle upon standing.

This invention is particularly useful in the preparation of polyamides containing high concentrations of mineral pigments such as 8 to 35% based on total weight of polymer and pigment. The high quality of the dispersions permits preparation of polymers which can be spun into filaments with acceptable spinning pack life. Improved process economics result from adding a relatively small amount of water to the polymerization system with the dispersion since the dispersion is predominantly pigment and nylon salt.

It is difficult to eliminate undesired agglomerated pigment particles from highly concentrated slurries or dispersions since settling techniques are not effective and filtering is quite difficult. This problem is solved by this invention by first attrition milling an aqueous slurry at a very high concentration, a condition which favors breaking up substantially all of the agglomerated particles within a reasonable time such as 45 minutes or less. Any suitable attrition mill such as a ball mill or a high-energy mill may be used. When necessary, the milled slurry may be slightly diluted with water to obtain a more suitable viscosity for pumping the slurry. The slurry preferably is milled until it is substantially free of agglomerates as determined by essentially no separation of particles upon filtering through an appropriately sized mesh screen.

The milled dispersion is flocculated by mixing with a concentrated nylon salt solution. Flocculation involves an interaction between titanium dioxide particles and nylon salt as shown by a substantial increase in slurry viscosity. The flocculated pigment particles have a reduced tendency to settle, but more importantly, to resist packing upon settling such that the flocculated dispersion can much more readily be stirred up and redispersed to a uniform condition after standing.

Preferably the amount of nylon salt solution added to the milled slurry is sufficient to completely flocculate the pigment particles. With complete flocculation, when the flocculate settles a completely clear liquid layer remains above. With inadequate flocculation, the liquid above the settled flocculate remains cloudy from unflocculated, extremely fine, pigment particles.

This invention is suitable for the preparation of pigmented polyamides prepared by the condensation polymerization of alkylenediammonium dicarboxylate salts which are commonly referred to as nylon salts. Suitable diamines include alkylenediamines containing from 4 to 12 carbon atoms, cycloaliphatic amines such as bis(4-aminocyclohexyl)methane and mixtures thereof. Suitable dicarboxylic acids are the alphaomega, aliphatic dicarboxylic acids containing from 4 to 12 carbon atoms, aromatic acids such as isophthalic acid, and mixtures thereof. The concentrated salt solutions used to mix with the milled slurry are preferably of the same salt as that of the polyamide being prepared. Where the polyamide is to be a copolyamide the added salt may be a single salt or a mixed salt.

Other commonly known dispersing agents suitable for dispersing pigments in water for use in polyamide polymerizations may be employed. Particularly suitable dispersing agents include potassium tripolyphosphate, sodium tripolyphosphate, sodium silicate, sodium aluminate, and tetra-potassium pyrophosphate.

As known in the art, the pigment dispersions may be introduced during the polyamide polymerization process either with the reactants prior to polymerization or at any stage before completion of the polymerization. Generally it is more desirable to add the dispersion after the polymerization has begun. The dispersion may be introduced into an autoclave as taught by Hoff in U.S. Pat. No. 2,278,878 or into a continuous polymerization process as described by Heckert in U.S. Pat. No. 2,689,839 and by Jaswal et al. in U.S. Pat. No. 3,900,450.

The following Examples illustrate the invention in greater detail. Percentages are based on total weight unless otherwise specified.

EXAMPLE I

A 79.9 kg (176 lbs.) portion of demineralized water and 908 g. (2.0 lbs.) of tetrasodium pyrophosphate dispersant are charged to an empty, 100 gal. (378.5 l.) capacity, clean Daymax high energy mill (Day Mixing, 4900 Beech St., Cincinnati, Ohio 45212) fitted with baffles to minimize vortex action during milling. The mill is operated 5 minutes to dissolve the dispersant. A charge of 227 kg (500 lbs.) of (Type R-900) rutile $TiO_2$ powder is added to the mill over 8 minutes while milling to give a final slurry concentration of 73.1% $TiO_2$. Milling is continued for 30 minutes and stopped. An additional charge of 43.1 kg (95 lbs.) of demineralized water is added and the slurry is milled 5 minutes to give 65% $TiO_2$. A 48% 66 nylon salt (hexamethylenediammonium adipate) solution in water (substantially saturated at room temperature), 115.8 kg (255 lbs.), is added to a second Daymax mill. While milling the 48% 66 nylon salt in the second Daymax mill, 186.1 kg (410 lbs.) of 65% $TiO_2$ slurry is added over 10 minutes. The 66 nylon saltdispersed $TiO_2$ is milled an additional 5 minutes to give a slurry containing 36.8% $TiO_2$, 21% 66 nylon salt and having a pH of 8.6. The slurry is pumped to a hold tank and kept under mild agitation using a mixer until required for preparation of high-concentration-$TiO_2$ 66 nylon polymer.

A 138.8 kg aqueous solution containing 48% by weight of hexamethylene diammonium adipate (66 nylon salt) is charged into a stainless steel vessel to which is added 19.1 g of a solution containing 25% by weight acetic acid and 19.5 g of a solution containing 10% of standard antifoaming agent. The charge is concentrated by evaporation to about 60% solids by weight and transferred to a stainless steel autoclave equipped with an agitator. The autoclave is purged of air with inert gas and is heated to 210° C to a pressure of approximately 18 atmos. A 39.9 kg portion of the 36.8% by weight titanium dioxide slurry is charged with agitation into the pressurized autoclave. The heating is continued until the temperature reaches 240° C and the pressure is gradually reduced to atmospheric pressure. The polymerization cycle is continued by holding the polymer at 278° C for approximately 0.5 hours in a steam atmosphere. Upon completion of the polymerization reaction, the molten polymer is extruded in the form of a ribbon. After quenching with water in a trough, the ribbon is cut into flake. The flake is then dried in a heated, tumbling vessel. The flake has a relative viscosity (RV) of 29.9 and contains 17.8% $TiO_2$, where RV is the ratio of the viscosity of a solution of 5.5 grams of the polymer in 50 ml. of 90% formic acid (aqueous) to the viscosity of the same solvent in the same units at 25° C. The polymer is successfully spun as the sheath polymer on a screw melter spinning machine using a spinneret assembly to spin concentric sheath/core filaments, the filaments having a conductive core of carbon black in polyethylene as described in U.S. Pat. No. 3,803,453 to Hull.

EXAMPLE II

A 48% 66 nylon salt (hexamethylene diammonium adipate) solution in water 216 kg (476 lbs.) is weight in a portable tank, mixed, and added to No. 1 Daymax mill (100 gallons capacity). A 79.9 kg (176 lbs.) portion of demineralized water is added to No. 2 Daymax mill (100 gallons capacity). The No. 2 mill is started and 908 g. of tetrasodium pyrophosphate is added. With the No. 2 mill operating, 227 kg (500 lbs.) of (R-900) rutile $TiO_2$ pigment is added over 8 minutes, adding the last slowly to avoid overloading the mill. The $TiO_2$ slurry in No. 2 mill is milled 30 minutes to give 74.7% $TiO_2$. An additional 17.3 kg (38 lbs.) of demineralized water is added to No. 2 mill, milled for 2 min. to give 70.8% $TiO_2$ and stopped. While milling the 66 nylon salt solution charge in Daymax mill No. 1, the 70.8% $TiO_2$ water slurry in mill No. 2 is pumped through a 1.9 cm (.75 inch) inside diameter pipe that discharges over a period of 10 minutes above the surface of the milling 66 nylon salt. All the 70.8% $TiO_2$ water slurry in mill No. 2 is pumped over to mill No. 1 except that left in the pump and pipe line. The 66 nylon salt dispersed $TiO_2$ in No. 1 Daymax mill is milled 10 minutes to give 40.5% $TiO_2$ and 20% 66 nylon salt. The slurry is pumped to a hold tank and kept under mild agitation until required for preparation of high-concentration-$TiO_2$ 66 nylon polymer.

A 104.6 kg aqueous solution containing 48% by weight of hexamethylene diammonium adipate (66 nylon salt) is charged into a stainless steel vessel to which is added 14.3 g of a solution containing 25% by weight acetic acid, 170.2 g of a solution containing 2.3% by weight manganous hypophosphite in water, and 18.0 gm of a solution containing 10% of a standard anti-foaming agent. The charge is concentrated by evaporation to about 60% solids by weight and transferred to a stainless steel autoclave equipped with an agitator. The autoclave is purged of air with inert gas and is heated to 210° C. to a pressure of approximately 18 atmos. A 42.9 kg portion of the 40.5% titanium dioxide slurry is charged with agitation into the pressurized autoclave. The heating is continued until the temperature reaches 240° C and the pressure is gradually reduced to atmospheric pressure. The polymerization cycle is continued by holding the polymer at 278° C for approximately 0.5 hours in a steam atmosphere. Upon completion of the polymerization reaction, the molten polymer is extruded in the form of a ribbon. After quenching with water in a trough, the ribbon is cut into chips that fall through a ¼ inch screen. The flake is then dried in a heated tumbling vessel. The flake has these properties:
RV; 24.6
$TiO_2$%; 25.5
Mn (ppm); 14.
Filaments are successfully melt spun and drawn using this polymer as the sheath polymer as in Example I.

What is claimed is:

1. In a polymerization process to form a pigmented polyamide from a nylon salt wherein an aqueous dispersion of a finely divided mineral pigment is added to the polymerforming reactants prior to completion of the polymerization, the improvement comprising preparing the dispersion by milling a concentrated slurry of the pigment in water in the presence of a dispersing agent to separate agglomerated pigment particles and mixing the milled slurry with a concentrated aqueous solution of a nylon salt to flocculate the pigment particles and with additional milling forming a flocculated dispersion containing from about 25 to 45% of the pigment.

2. The process of claim 1 wherein the pigment is titanium dioxide pigment.

3. The process of claim 2 wherein the concentrated slurry contains about 70 to 80% of the pigment and the dispersing agent comprises from about 0.2 to 0.6% by weight of the pigment of tetrasodium pyrophosphate.

4. The process of claim 3 wherein the pigment is completely flocculated by mixing with a substantially saturated nylon salt solution.

5. The process of claim 4 wherein the salt is hexamethylenediammonium adipate.

6. The process of claim 5 wherein the flocculated dispersion contains about 36 to 41% pigment and about 20 to 22% nylon salt by weight of the dispersion.

7. The process of claim 5 wherein a polymer is formed containing from 8 to 35% of titanium dioxide.

8. The process of claim 7 wherein the pigmented polymer is spun into a filament.

* * * * *